(12) United States Patent
Hiroi et al.

(10) Patent No.: US 7,717,007 B2
(45) Date of Patent: May 18, 2010

(54) GEAR CHANGE CONTROL DEVICE AND STRADDLE-TYPE VEHICLE

(75) Inventors: Kazutaka Hiroi, Shizuoka (JP); Shigeo Morisugi, Shizuoka (JP); Masao Sugita, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 533 days.

(21) Appl. No.: 11/689,393

(22) Filed: Mar. 21, 2007

(65) Prior Publication Data

US 2007/0283779 A1 Dec. 13, 2007

(30) Foreign Application Priority Data

Mar. 22, 2006 (JP) ............................. 2006-078064
Sep. 28, 2006 (JP) ............................. 2006-265159

(51) Int. Cl.
*F16H 59/00* (2006.01)

(52) U.S. Cl. ........................... 74/335; 74/337.5; 477/80

(58) Field of Classification Search ................. 74/337.5
See application file for complete search history.

(56) References Cited

U.S. PATENT DOCUMENTS

| 4,911,031 | A | * | 3/1990 | Yoshimura et al. | ............ | 74/335 |
| 6,073,507 | A | * | 6/2000 | Ota et al. | ....................... | 74/335 |
| 6,085,607 | A | * | 7/2000 | Narita et al. | .................. | 74/335 |
| 6,249,734 | B1 | * | 6/2001 | Ota | ............................. | 701/51 |
| 7,511,444 | B2 | * | 3/2009 | Nakai et al. | ................. | 318/632 |

FOREIGN PATENT DOCUMENTS

JP 11-082709 3/1999

* cited by examiner

*Primary Examiner*—David D Le
*Assistant Examiner*—Justin Holmes
(74) *Attorney, Agent, or Firm*—Keating & Bennett, LLP

(57) ABSTRACT

A gear change control device for improving the stability of shift changes in a straddle-type vehicle. In response to an operation of a shift up switch or a shift down switch, the target angular position ($\theta_{max(up)}$, $\theta_{max(down)}$, $\theta_{meet(up)}$, $\theta_{meet(down)}$, $\theta_{on(up)}$, $\theta_{on(down)}$) and the rotational speed ($v_{max(up)}$, $v_{max(down)}$, $v_{o(up)}$, $v_{o(down)}$, $v_{12(up)}$-$v_{34(up)}$, $v_{21(down)}$-$v_{43(down)}$) of a shift shaft are set based on a gear change command input signal inputted from the shift up switch or the shift down switch to a CPU. The shift shaft is rotationally driven at the set rotational speed until the set target rotational position is reached.

24 Claims, 14 Drawing Sheets

[FIG. 1]
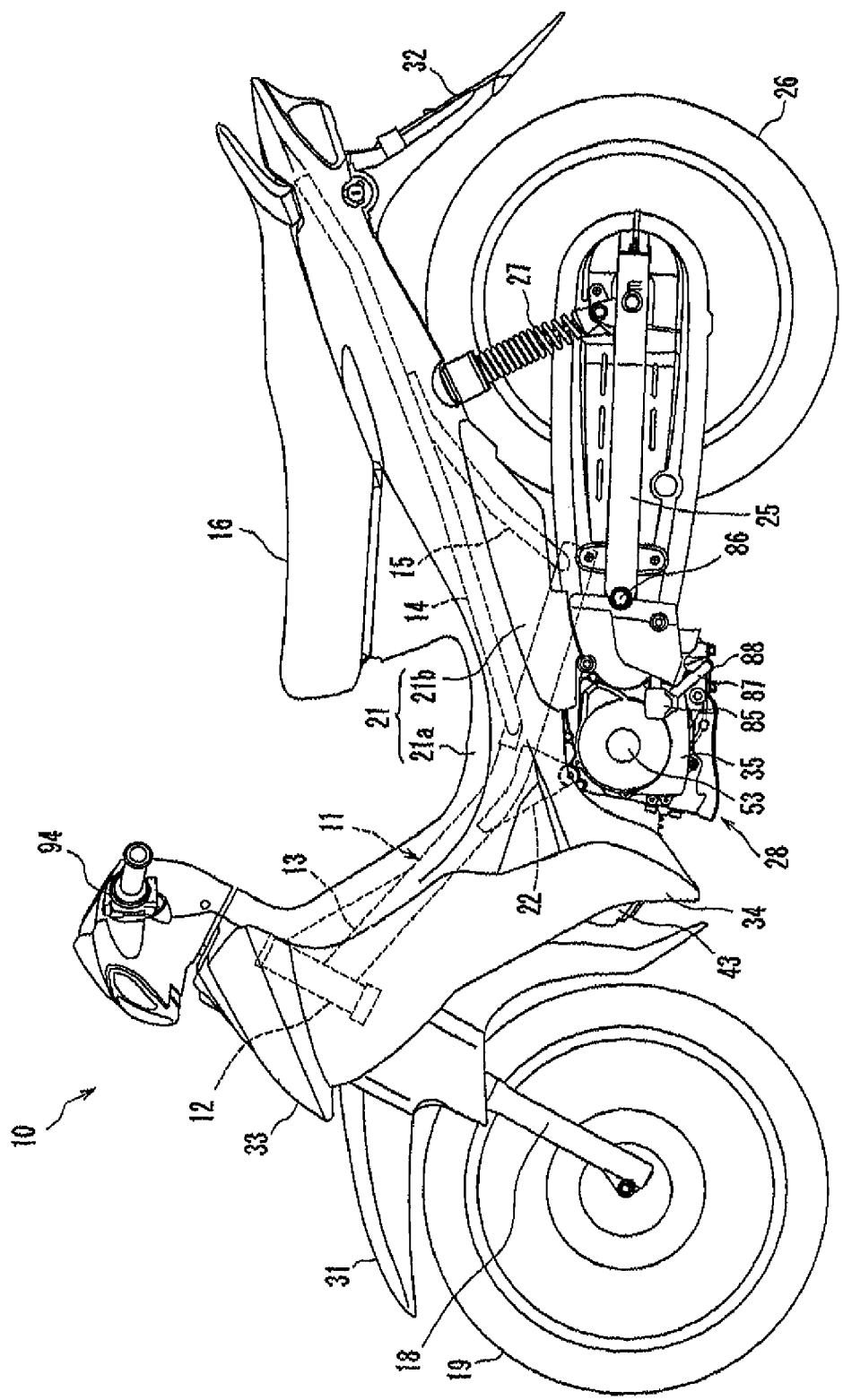

[FIG. 2]
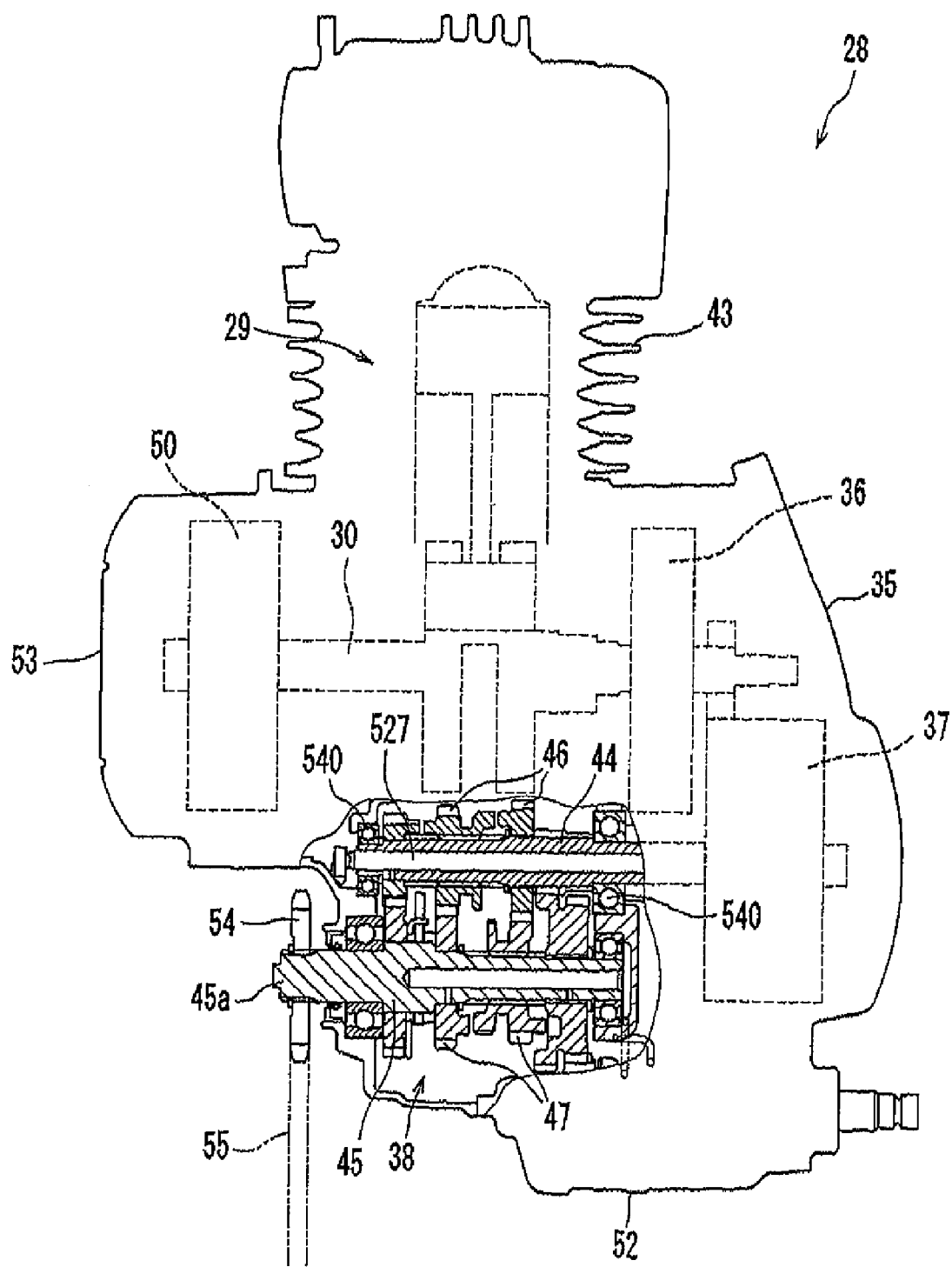

[FIG. 3]
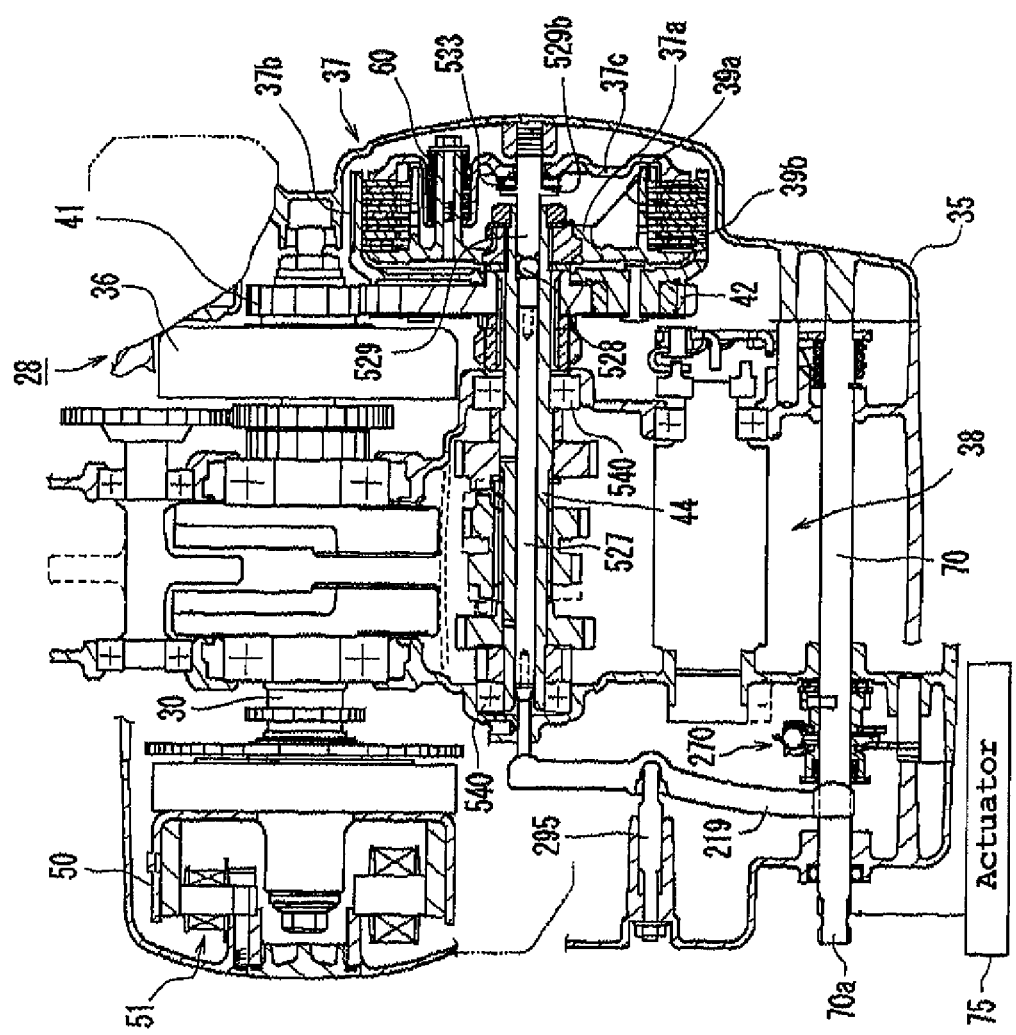

[FIG. 4]
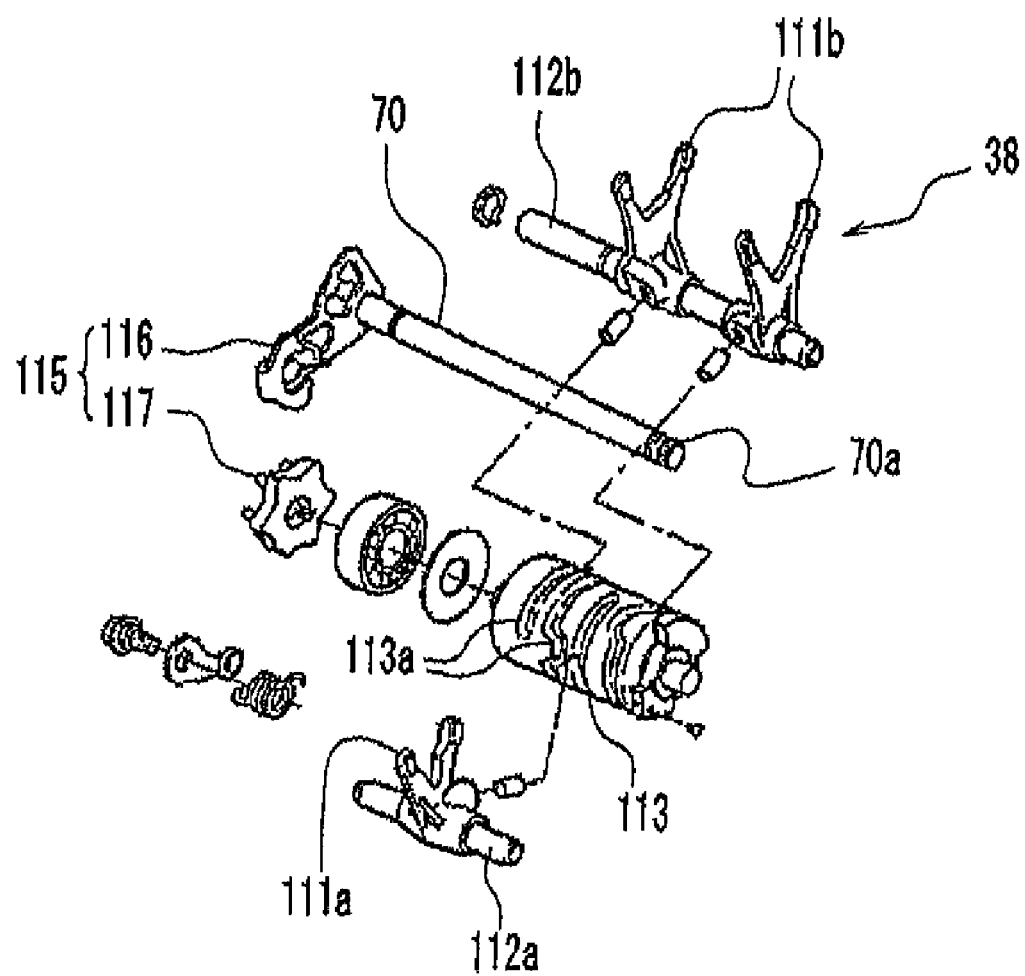

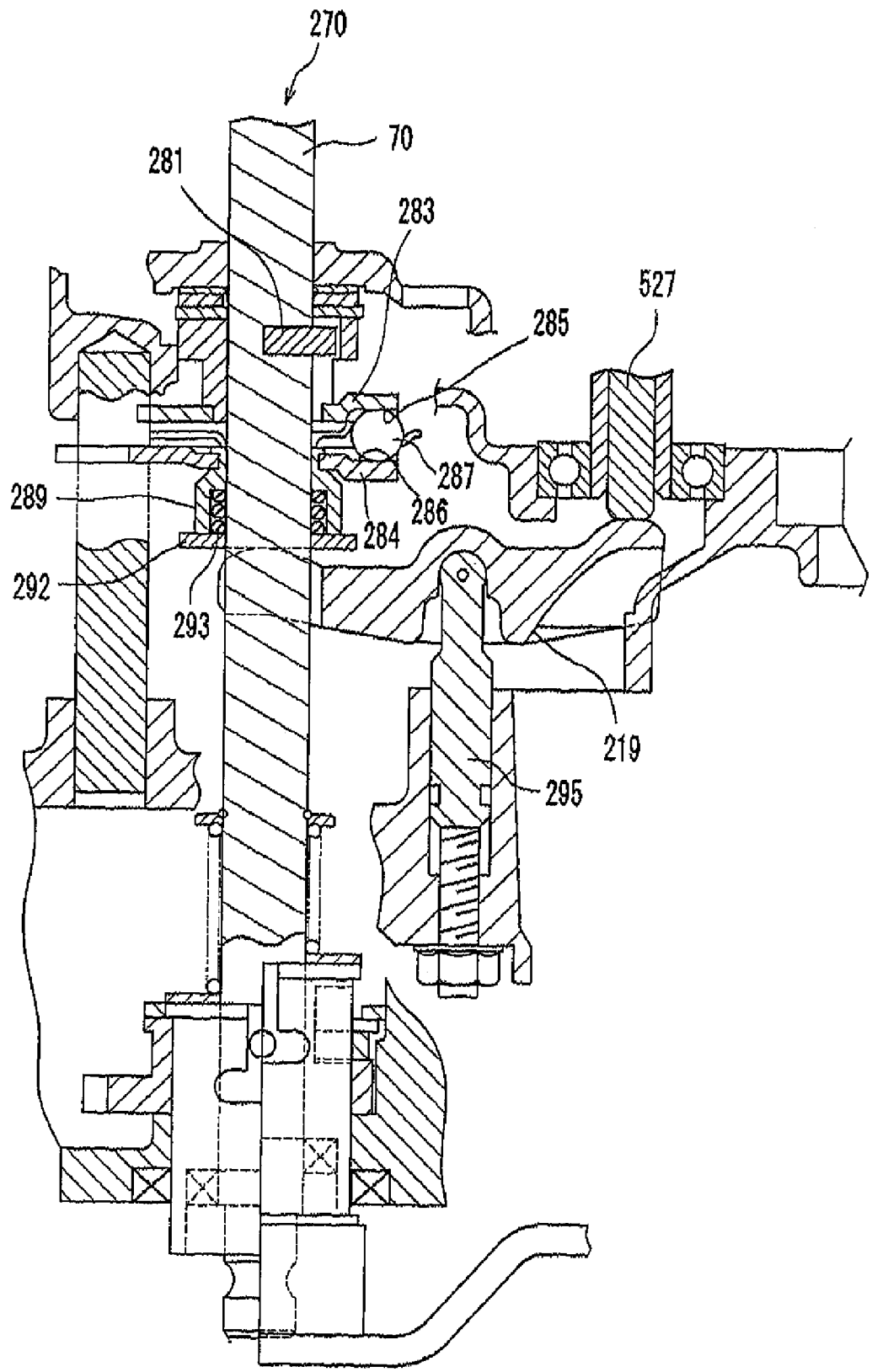
[FIG. 5]

[FIG. 6]
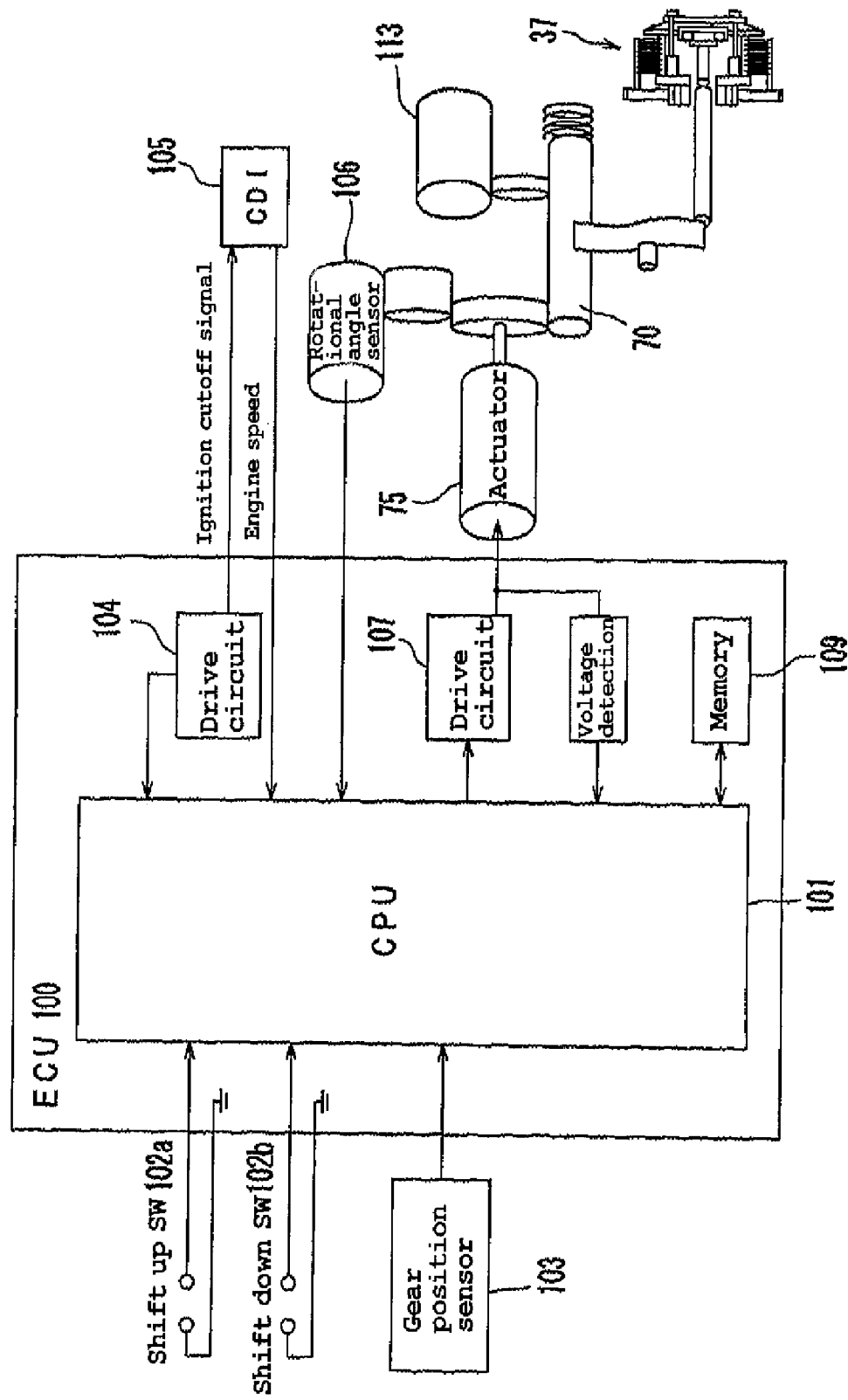

[FIG. 7]
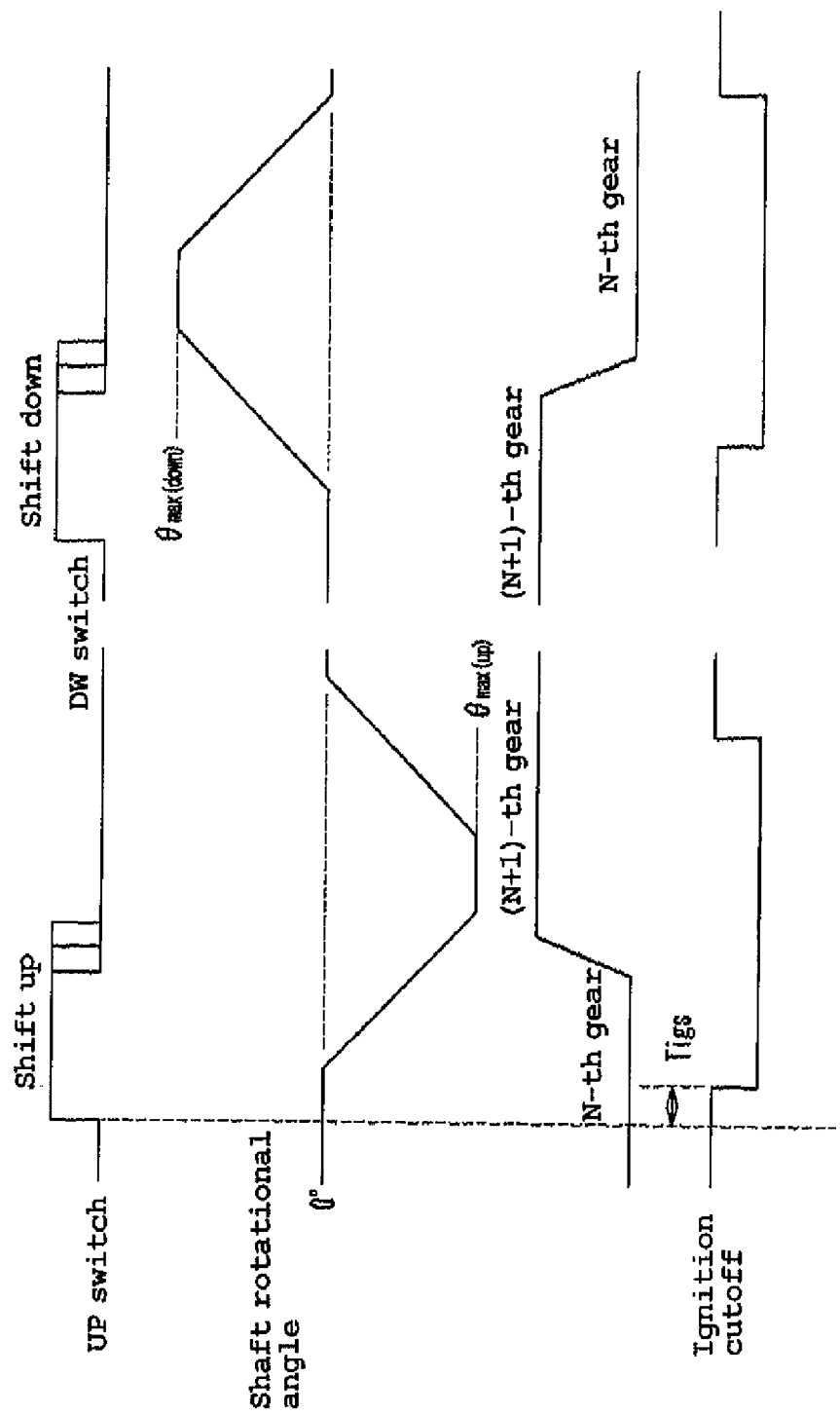

[FIG. 8]
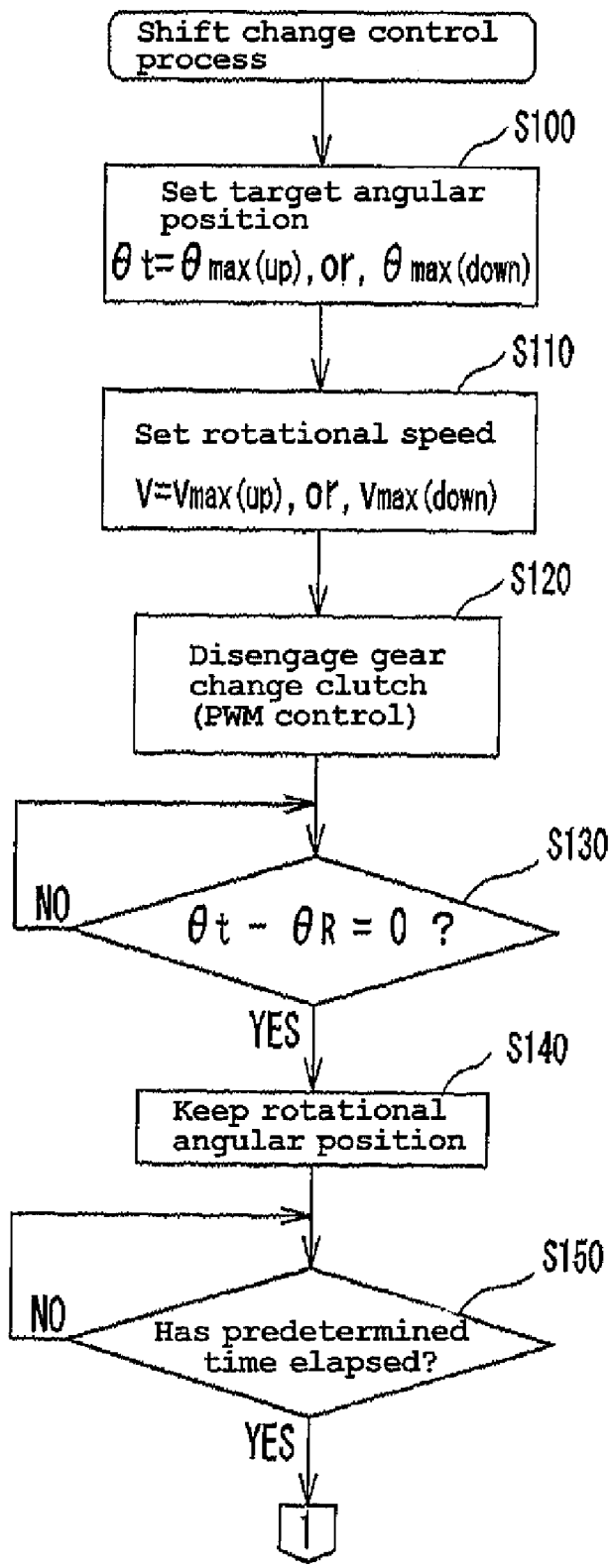

[FIG. 9]
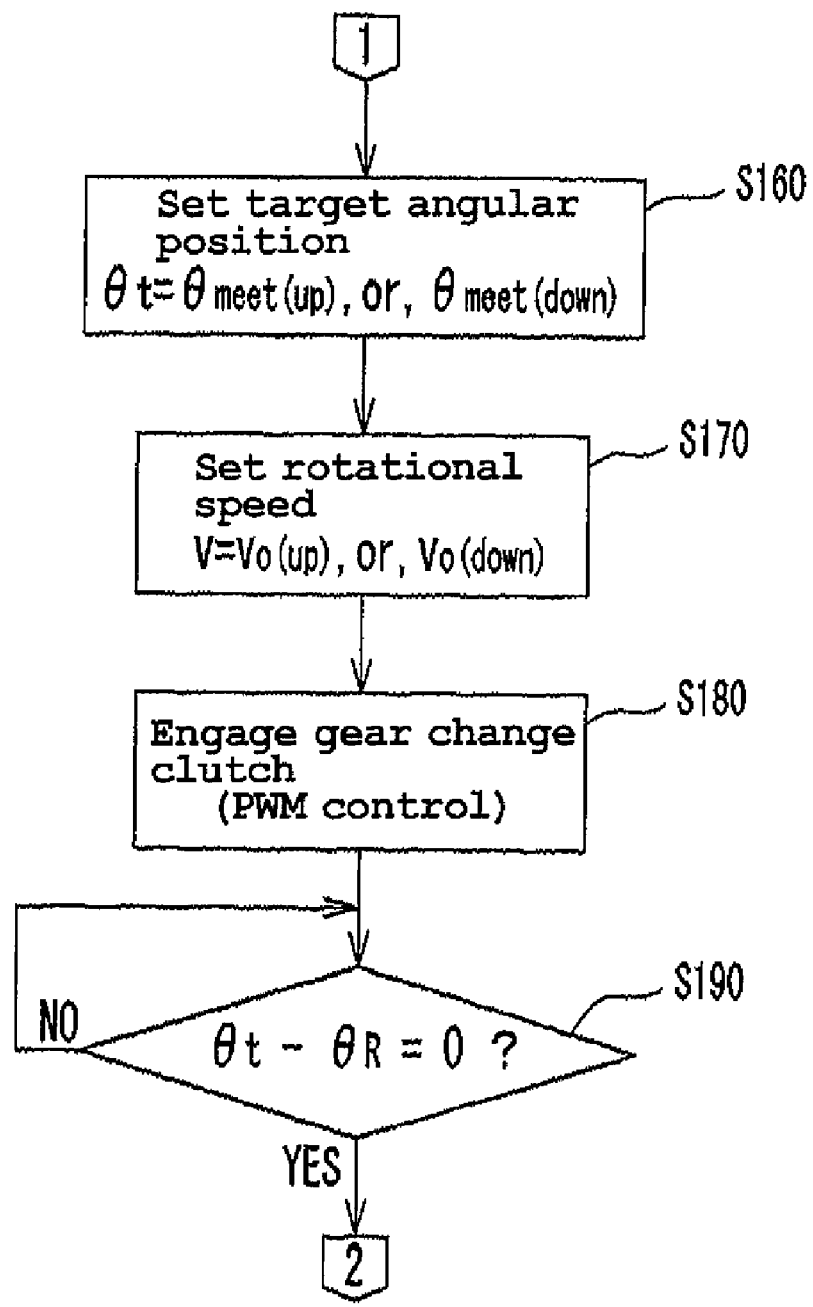

[FIG. 10]
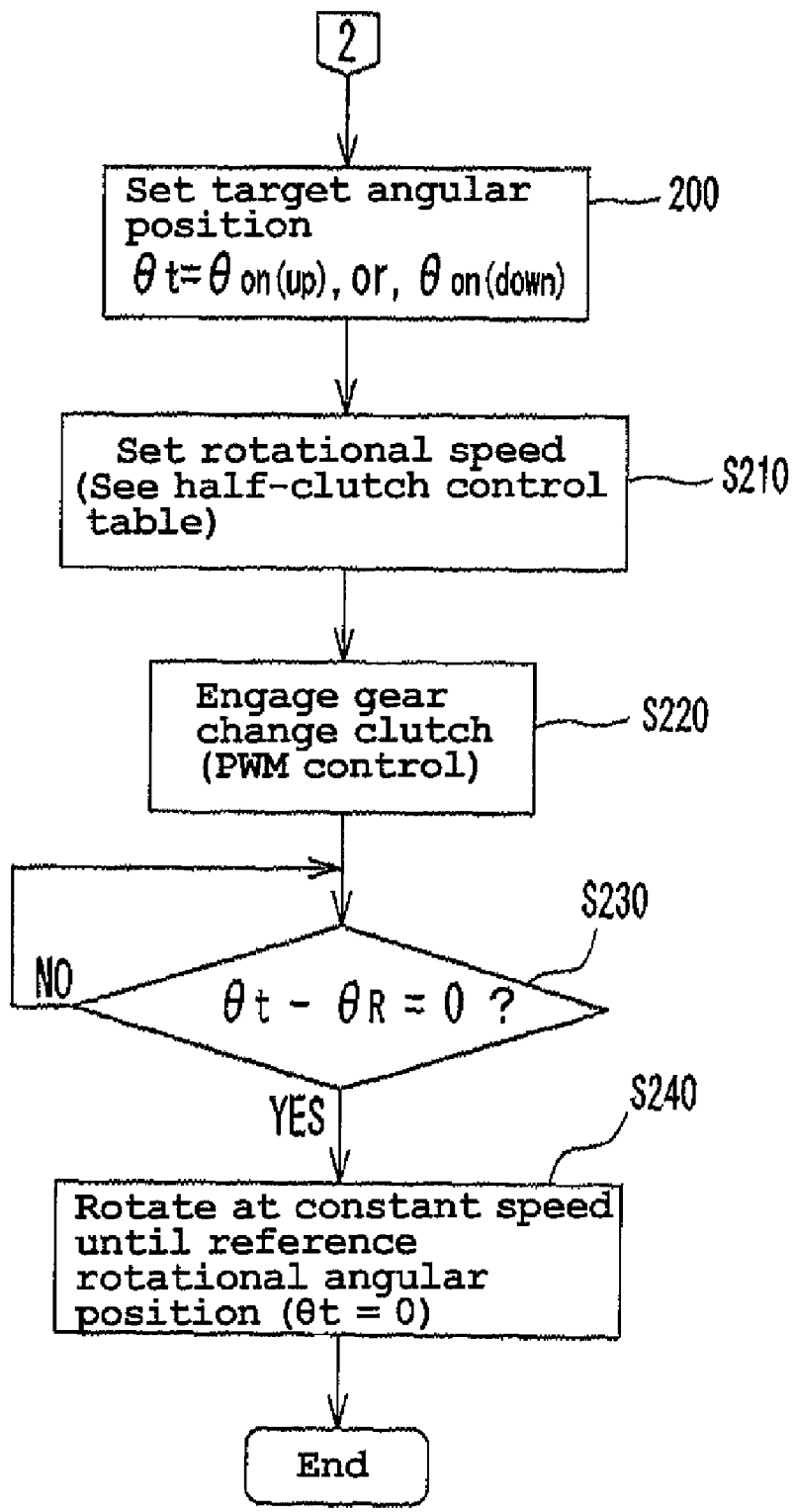

[FIG. 11]

|  |  | Rotational speed |
|---|---|---|
| Shift up | 1st to 2nd gear | $V_{12}(up)$ |
|  | 2nd to 3rd gear | $V_{23}(up)$ |
|  | 3rd to 4th gear | $V_{34}(up)$ |
| Shift down | 2nd to 1st gear | $V_{21}(down)$ |
|  | 3rd to 2nd gear | $V_{32}(down)$ |
|  | 4th to 3rd gear | $V_{43}(down)$ |

[FIG. 12]
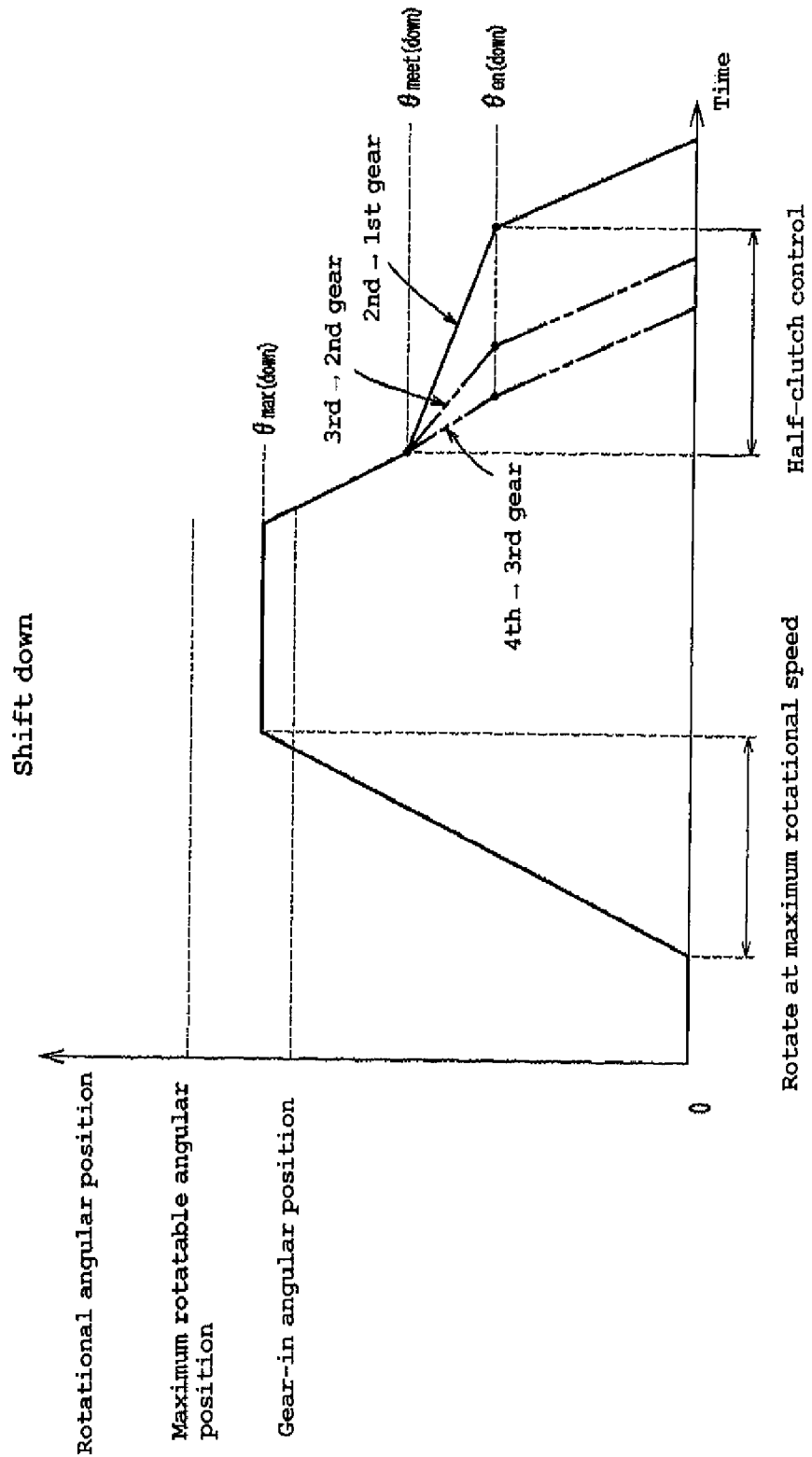

[FIG. 13]
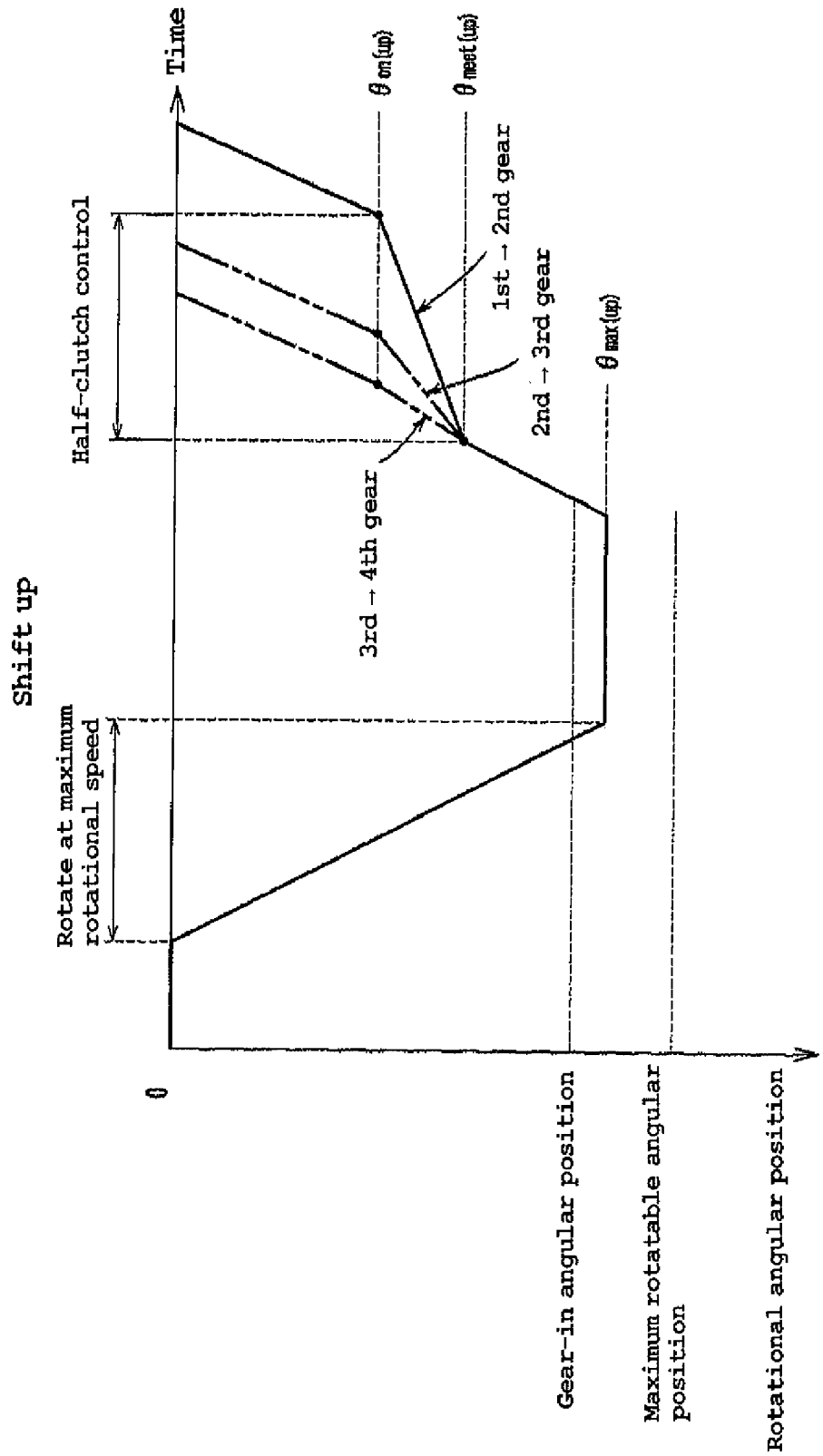

[FIG. 14]

| | No | Detail of abnormality content | Subsequent gear change | Condition of canceling abnormality |
|---|---|---|---|---|
| First type | 1 | Shift change not completed for reason other than dog abutment | Prohibited | Main switch off |
| | 2 | Gear other than target gear or formerly used gear is in at completion of gear change | Prohibited | Main switch off |
| | 3 | Shift change performed without gear change command | Prohibited | Main switch off |
| | 4 | Angle sensor system failure | Prohibited | Main switch off |
| | 5 | Engine speed input breakage determined | Prohibited | Main switch off |
| | 6 | Motor terminal voltage abnormality determined | Prohibited | Main switch off |
| | 7 | Shift down SW abnormality determined | Prohibited | Main switch off |
| | 8 | Shift up SW abnormality determined | Prohibited | Main switch off |
| | 9 | Gear position signal system failure | Prohibited (if engine speed is low, allowed) | Gear position determined |
| Second type | 10 | Too long time from start to completion of gear change | Allowed | Following conditions are not met at subsequent gear change:<br>1) Target gear is used at completion of gear change; and<br>2) Time from start to completion of gear change is not less than predetermined value. |
| | 11 | NG at initial check | Allowed | Main switch off |
| | 12 | Engine stall determined | Allowed | Following conditions are not met:<br>1) Engine speed signal is in Low level; and<br>2) Engine speed is not more than predetermined value. |

US 7,717,007 B2

GEAR CHANGE CONTROL DEVICE AND STRADDLE-TYPE VEHICLE

RELATED APPLICATIONS

This application claims the benefit of priority under 35 USC 119 of Japanese patent application no. 2006-078064, filed on Mar. 22, 2006, and Japanese patent application no. 2006-265159, filed on Sep. 28, 2006, which applications are hereby incorporated by reference in their entireties.

BACKGROUND OF THE INVENTION

1. Field of the Invention

The present invention relates to a gear change control device for a straddle-type vehicle.

2. Description of Related Art

A conventional gear change control device performs a series of shift change operations, including disengaging a gear change clutch, changing gears and engaging the gear change clutch, in conjunction with rotation of a shift shaft by an actuator having an electric motor or the like (see JP-A-Hei 11-82709, for example).

The gear change control device described in JP-A-Hei 11-82709 regulates the driving behavior of the actuator in terms of time. Specifically, the device rotates the shift shaft through the actuator to a reference rotational angular position, and then controls the shift shaft for a predetermined period.

However, the gear change control device of JP-A-Hei 11-82709 does not determine what rotational angular position the shift shaft has finally reached. Thus, the rotational angular position of the shift shaft may be different from the rotational angular position to be reached, which may cause unstable shift changes.

SUMMARY OF THE INVENTION

The present invention addresses these problems and improves the stability of shift changes.

The present invention provides a gear change control device for a straddle-type vehicle having a gear change command inputting device to which a gear change command from a rider is inputted, a gear change clutch, a gearbox, a gear position detecting device for detecting the gear position of the gearbox, a shift shaft, and an actuator for engaging and disengaging the gear change clutch and changing gears of the gearbox by rotating the shift shaft from the reference angular position. The gear change control device includes: a rotational angle detecting device for detecting the rotational angular position of the shift shaft; a target angular position setting device for setting the target angular position of the shift shaft based on the input from the gear change command inputting device; a rotational speed setting device for setting the rotational speed of the shift shaft based on the input from the gear change command inputting device; and a control unit for calculating, based on the actual rotational angular position detected by the rotational angle detecting device and the target angular position set by the target angular position setting device, the difference between the actual rotational angular position and the target angular position, and performing drive control of the actuator based on the calculated difference between the actual rotational angular position and the target angular position and the rotational speed set by the rotational speed setting device.

According to the invention, the target angular position and rotational speed of the shift shaft are set based on the input from the gear change command inputting device, and drive control of the actuator is performed based on the set target angular position and rotational speed. Thus, the shift shaft reliably reaches the set target angular position and the stability of shift changes is improved.

As described above, according to the present invention, the stability of shift changes is improved.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a left side view of a two-wheeled motor vehicle according to an embodiment of the invention.

FIG. 2 is a partially cutaway cross-sectional view of an engine unit according to an embodiment of the invention.

FIG. 3 is a cross-sectional view of the engine unit of FIG. 2.

FIG. 4 is an exploded perspective view of a part of a gearbox according to an embodiment of the invention.

FIG. 5 is an enlarged cross-sectional view illustrating a clutch transmitting mechanism shown in FIG. 3.

FIG. 6 is a block diagram schematically illustrating the configuration of a control system according to an embodiment of the invention mounted on the two-wheeled motor vehicle.

FIG. 7 is a timing diagram of a shift change operation according to an embodiment of the invention.

FIG. 8 is a flowchart of a shift change control process according to an embodiment of the invention.

FIG. 9 is a flowchart of a shift change control process according to an embodiment of the invention.

FIG. 10 is a flowchart of a shift change control process according to an embodiment of the invention.

FIG. 11 is a half-clutch control table according to an embodiment of the invention.

FIG. 12 is a diagram illustrating changes in the rotational angular position of a shift shaft during the shift change control process of FIGS. 8-10.

FIG. 13 is a diagram illustrating changes in the rotational angular position of a shift shaft during the shift change control process of FIGS. 8-10.

FIG. 14 is a table describing abnormalities according to an embodiment of the invention.

DETAILED DESCRIPTION OF THE INVENTION

An embodiment of the invention is now described with reference to the drawings.

As shown in FIG. 1, a straddle-type vehicle according to this embodiment is a two-wheeled motor vehicle 10. Two-wheeled motor vehicle 10 is a so-called moped type having a body frame 11 and a seat 16. The term "moped type" simply refers to the shape of the vehicle, and does not otherwise limit characteristics such as top speed, displacement, size or the like in any way. A straddle-type vehicle according to the prevent invention may be another type of two-wheeled motor vehicle such as a so-called motorcycle type having a fuel tank in front of a seat, a three-wheeled motor vehicle, an ATV and the like.

In the following description, the terms "front", "rear", "right" and "left" refer to directions as viewed from a rider seated on seat 16. Body frame 11 has a steering head pipe 12, a main frame 13 extending rearward and obliquely downward from steering head pipe 12, a pair of right and left seat rails 14 extending rearward and obliquely upward from an intermediate portion of main frame 13, and a pair of right and left backstays 15 extending rearward and obliquely upward from a portion of main frame 13 more rearward than seat rail 14. Backstays 15 are connected to the rear end of main frame 13 and an intermediate portion of seat rails 14. A front wheel 19 is supported by steering head pipe 12 via a front fork 18.

An upper side and right and left sides of body frame 11 are covered mainly with a main cover 21a and a side cover 21b, respectively. Hereinafter, main cover 21a and side cover 21b are collectively referred to as "body cover 21".

A pair of right and left first engine brackets 22 protrude downward from an intermediate portion of main frame 13. A pair of right and left second engine brackets and a pair of right and left rear arm brackets (not shown) are provided at the rear end of main frame 13. Hereinafter, the brackets provided on main frame 13 or the like are considered as part of body frame 11.

The rear arm brackets protrude downward from the rear end of main frame 13. The rear arm brackets have a pivot shaft 86, and the front end of a rear arm 25 is swingably supported by pivot shaft 86. A rear wheel 26 is supported at the rear end of rear arm 25. The rear part of rear arm 25 is suspended by body frame 11 via a cushion unit 27.

Vehicle 10 has a front fender 31 for covering an upper side and a rear side of front wheel 19, and a rear fender 32 for covering a rear and obliquely upper side of rear wheel 26. In addition to body cover 21, vehicle 10 has a front cowl 33 and right and left leg shields 34.

An engine unit 28 for driving rear wheel 26 is supported by body frame 11. Engine unit 28 has a crankcase 35 and a cylinder 43 extending forward, or forward and obliquely upward, from crankcase 35.

A footrest 85 is disposed on the right and left sides of engine unit 28. Footrests 85 are supported by crankcase 35 via a coupling rod 87 and a mounting plate 88 secured to coupling rod 87.

The construction of engine unit 28 is now described with reference to FIGS. 2, 3 and so on. Engine unit 28 has an engine 29 having a crankshaft 30, a centrifugal clutch 36, a gear change clutch 37 to be engaged and disengaged at gear changes, and a gearbox 38. The type of engine 29 is not limited in any way. In this embodiment, engine 29 is a 4-cycle single-cylinder engine. Engine 29 is not limited to an internal combustion engine such as a gasoline engine. It may be, for example, a motor engine or a hybrid of a gasoline engine and a motor engine.

As shown in FIG. 3, centrifugal clutch 36 is mounted to the right end of crankshaft 30. Although not shown, centrifugal clutch 36 has a clutch boss secured to crankshaft 30 and a clutch housing. Centrifugal clutch 36 is disengaged during idling and engaged during running. That is, centrifugal clutch 36 is disengaged when the rotational speed of crankshaft 30 (engine speed) is lower than a predetermined speed and engaged when it is equal to or higher than the predetermined speed.

Gear change clutch 37 is a multiplate wet clutch, and has a clutch boss 37a and a clutch housing 37b. The type of gear change clutch 37 is not specifically limited. Centrifugal clutch 36 is provided with a gear 41 and clutch housing 37b is provided with a gear 42. Gears 41 and 42 are in meshing engagement with each other. Therefore, clutch housing 37b of gear change clutch 37 rotates together with the clutch housing of centrifugal clutch 36.

Clutch boss 37a is mounted to and rotates together with a main shaft 44. Clutch housing 37b is attached for free rotation relative to main shaft 44. A plurality of friction plates 39a are provided to clutch boss 37a, and a plurality of clutch plates 39b are provided to clutch housing 37b. Each of the friction plates 39a is placed between adjacent clutch plates 39b and 39b.

A pressure plate 37c is disposed on the right side of clutch boss 37a. Pressure plate 37c is axially slidable, and urged leftward in FIG. 3 by a compression spring 60. That is, pressure plate 37c is urged in a direction to press friction plates 39a and clutch plates 39b into contact with each other. When pressure plate 37c moves rightward against the urging force of compression spring 60, friction plates 39a and clutch plates 39b come out of contact with each other so that gear change clutch 37 is disengaged.

As shown in FIG. 2, a plurality of shift gears 46 are provided on the outer periphery of main shaft 44. A plurality of shift gears 47 are mounted on a drive shaft 45 disposed in parallel to main shaft 44. Shift gears 46 on main shaft 44 and shift gears 47 on drive shaft 45 are appropriately in meshing engagement with each other.

Both or either of shift gears 46 and/or shift gears 47 are mounted on main shaft 44 or drive shaft 45 in such a manner as to idle relative thereto except for a selected gear. Therefore, transmission of driving force from main shaft 44 to drive shaft 45 is made through a pair of selected shift gears.

The selection of a shift gear is made via a shift cam 113 (see FIG. 4). As shown in FIG. 4, gearbox 38 has a shift fork 111a for causing shift gears 46 to slide in the axial direction of main shaft 44, and a slide rod 112a for slidably supporting shift fork 111a. Gearbox 38 also has a shift fork 111b for causing shift gears 47 to slide in the axial direction of drive shaft 45, and a slide rod 112b for slidably supporting shift fork 111b. A cam groove 113a is formed around shift cam 113. Shift forks 111a and 111b slide along cam groove 113a.

Shift cam 113 rotates via a ratchet mechanism 115 as a shift shaft 70 rotates. Ratchet mechanism 115 is designed to rotate shift cam 113 by a fixed angle at a time so as to move shift forks 111a and 111b regularly, and has a ratchet function allowing gear changes by one step at a time in both forward and reverse directions. A shift arm 116 of ratchet mechanism 115 transmits rotation of shift shaft 70, and limits the stroke of shift shaft 70 to prevent an overrun of shift cam 113. A stopper plate 117 of ratchet mechanism 115 keeps shift cam 113 in specified positions.

As shown in FIG. 3, hollow main shaft 44 is supported by a bearing 540 for free rotation. A first push rod 527, a ball 528 and a second push rod 529 are inserted in main shaft 44 for free axial movement, which in turn moves pressure plate 37c laterally.

Second push rod 529 is formed with a flange portion 529b. A bearing 533 is interposed between flange portion 529b and pressure plate 37c. With this construction, second push rod 529 is not rotatable but pressure plate 37c is rotatable.

Rotation of shift shaft 70 is converted to reciprocating movement of first push rod 527 through a clutch transmitting mechanism 270. FIG. 5 is an enlarged cross-sectional view illustrating clutch transmitting mechanism 270. Clutch transmitting mechanism 270 is a ball cam mechanism that converts rotation of shift shaft 70 to reciprocating movement.

Clutch transmitting mechanism 270 has: a first cam plate 283 connected to shift shaft 70 via a connecting pin 281 and rotatable together with shift shaft 70; a second cam plate 284 facing first cam plate 283; and three balls 287 (only one of which is shown in FIG. 5) received in first and second cam grooves 285 and 286 formed in opposing faces of cam plates 283 and 284, respectively, and held between cam plates 283 and 284. Cam plates 283 and 284 have a disk-like shape. First cam plate 283 is secured to shift shaft 70.

Second cam plate 284 is secured to a boss 289 movable in the axial direction of shift shaft 70, and a pressing plate 292 in contact with a pressure lever 219, which is described later, is secured to the lower end of boss 289. A compression coil spring 293 is interposed between pressing plate 292 and boss 289.

The left end of pressure lever 219 is in contact with pressing plate 292, and the right end thereof is in contact with first push rod 527 (see also FIG. 3). A longitudinal central portion of pressure lever 219 is supported by a spindle 295. Pressure lever 219 is swingable about the contact point between it and spindle 295.

When shift shaft 70 rotates in synchronization with rotation of an actuator 75 (see FIG. 3), first cam plate 283 also rotates in synchronization with shift shaft 70. Since second cam plate 284 does not rotate in synchronization with shift shaft 70, first cam plate 283 rotates relative to second cam plate 284. At this time, balls 287 move circumferentially in cam groove 286 of second cam plate 284 while being retained in cam groove 285 of first cam plate 283. When shift shaft 70 rotates further, balls 287 roll over and get out of cam groove 286. When balls 287 get out of cam groove 286, second cam plate 284 moves along the axial direction of shift shaft 70, thereby the left end of pressure lever 219 is pressed by pressing plate 292. When the left end of pressure lever 219 is pressed by pressing plate 292, pressure lever 219 swings about the contact point between it and spindle 295, thereby first push rod 527 is pressed by the right end of pressure lever 219. As first push rod 527 is pressed by pressure lever 219, first push rod 527 slides rightward, as shown in FIG. 3. In addition, second push rod 529 is pressed rightward by first push rod 527 via ball 528 to slide rightward.

As shown in FIG. 3, as second push rod 529 slides, pressure plate 37c moves rightward against the urging force of compression spring 60. As a result, friction plates 39a and clutch plates 39b come out of contact with each other so that gear change clutch 37 is disengaged.

In this way, shift shaft 70 and pressure plate 37c are coupled via pressure lever 219, first push rod 527, ball 528 and second push rod 529 such that pressure plate 37c moves as shift shaft 70 rotates. That is, when shift shaft 70 starts rotating, pressure plate 37c moves rightward. When shift shaft 70 reaches a predetermined rotational angle (clutch disengagement starting angle), gear change clutch 37 is disengaged. When shift shaft 70 rotates further to a predetermined angle (gear change starting angle), shift cam 113 rotates for a gear change.

A flywheel magneto 50 is mounted to the left end of crankshaft 30 as a rotating body that rotates together therewith. Flywheel magneto 50 serves as the rotor of a generator 51. The rotating body is not limited to flywheel magneto 50. Other types of rotating bodies such as a flywheel may be used.

As shown in FIG. 2, crankcase 35 has a first casing 52 and a second casing 53. Although not shown, first casing 52 is made up of a plurality of casing members, and covers mainly a part of crankshaft 30, centrifugal clutch 36, gear change clutch 37, main shaft 44, a part of drive shaft 45, shift cam 113 and so on. Second casing 53 covers flywheel magneto 50 and is located on the front side in the longitudinal direction of the vehicle with respect to first casing 52. Second casing 53 projects outward in the width direction of the vehicle (leftward in FIG. 2) with respect to first casing 52. In this embodiment, first casing 52 and second casing 53 are formed separately from each other. However, first casing 52 and second casing 53 may be formed integrally with each other.

As shown in FIG. 3, a projecting portion 70a of shift shaft 70 projects outward of crankcase 35. As shown in FIG. 2, a projecting portion 45a of drive shaft 45 also projects from crankcase 35. A sprocket 54 is secured to projecting portion 45a. A chain 55 as a power transmitting member is wrapped around sprocket 54 and a sprocket (not shown) of rear wheel 26. The power transmitting member for transmitting the driving force of drive shaft 45 to rear wheel 26 is not limited to chain 55. Other types of power transmitting members such as a driving belt or a drive shaft can also be used.

FIG. 6 is a block diagram schematically illustrating a control system mounted on vehicle 10. An ECU 100 has a CPU 101 to which a shift up switch (SW) 102a and a shift down switch (SW) 102b are connected. Shift up switch 102a and shift down switch 102b are provided on a left handlebar 94 (see FIG. 1) of vehicle 10, and are operated at shift changes (upshifting or downshifting). Shift up switch 102a and shift down switch 102b correspond to the gear shift command inputting device of the present invention.

A gear position sensor 103 is connected to CPU 101. Gear position sensor 103 detects the gear position (rotational position of shift cam 113). CPU 101 obtains the gear position based on the rotational position of shift cam 113 (see FIG. 4) detected by gear position sensor 103.

A CDI (Capacitive Discharge Ignition) unit 105 is connected to CPU 101 via a drive circuit 104. CDI unit 105 cuts off ignition for engine 29 based on an ignition cutoff signal sent from CPU 101 via drive circuit 104 to reduce the driving force of engine 29. CDI unit 105 sends the rotational speed of engine 29 (engine speed) to CPU 101.

Actuator 75 (see also FIG. 3) is connected to CPU 101 via a drive circuit 107. Actuator 75 includes an electric motor (not shown). As actuator 75 is driven, shift shaft 70 rotates. Drive circuit 107 performs drive control (PWM control) of the electric motor of actuator 75 based on a control signal from CPU 101.

A rotational angle sensor 106 is connected to CPU 101. Rotational angle sensor 106 detects the rotational angular position of shift shaft 70 (see also FIG. 3). Rotational angle sensor 106 may detect the rotational angular position of shift shaft 70 either directly or indirectly.

A shift change operation performed while vehicle 10 is running is now described. FIG. 7 is a timing diagram for explaining the shift change operation. When a shift up operation is performed (shift up switch 102a is operated), shift shaft 70 rotates to and fro, or rotates (in reverse) until the rotational angular position reaches $\theta_{max(up)}$ and then returns to the reference angular position (0°). On the other hand, when a shift down operation is performed (shift down switch 102b is operated), shift shaft 70 rotates to and fro, or rotates (forward) until the rotational angular position reaches $\theta_{max(down)}$ and then returns to the reference angular position (0°). $\theta_{max(up)}$ is a predetermined rotational angular position that is not less than the rotational angular position of shift shaft 70 at which gearbox 38 becomes the gear-in state during rotation of shift shaft 70 in the upshifting (reverse) direction, and that is less than the maximum rotatable angular position of shift shaft 70 during rotation thereof in the same direction. $\theta_{max(down)}$ is a predetermined rotational angular position that is not less than the rotational angular position of shift shaft 70 at which gearbox 38 becomes the gear-in state during rotation of shift shaft 70 in the downshifting (forward) direction, and that is less than the maximum rotatable angular position of shift shaft 70 during rotation thereof in the same direction. In this embodiment, $\theta_{max(up)}$ and $\theta_{max(down)}$ may be different from or the same as each other in magnitude (absolute value). That is, target angular positions to be set for a shift up and a shift down may be different from or the same as each other in magnitude.

During to-and-fro rotation of shift shaft 70, a series of shift change operations are performed, including disengaging gear change clutch 37, changing gears and engaging gear change clutch 37. Also, during to-and-fro rotation of shift shaft 70, CDI unit 105 cuts off ignition to reduce the engine driving force.

The shift change operation is described in more detail below. FIGS. 8-10 are flowcharts showing a shift change control process. The shift change control process is called up from a mail routine that is executed in advance and executed in response to a shift change operation, that is, an operation of shift up switch 43a or shift down switch 43b.

A target angular position is first set in step S100 (FIG. 8). In step S100, ECU 100 sets a target angular position of shift shaft 70 based on a gear change command input signal inputted to CPU 101 when shift up switch 102a or shift down switch 102b is operated. When shift up switch 102a is operated and an upshift gear change command input signal is inputted to CPU 101, the target angular position ($\theta_t$) is set to $\theta_{max(up)}$. When shift down switch 102b is operated and a downshift gear change command input signal is inputted to CPU 101, the target angular position ($\theta_t$) is set to $\theta_{max(down)}$.

After step S100, a rotational speed is set in step S110. In step S110, ECU 100 sets a rotational speed of shift shaft 70 based on the gear change command input signal inputted to CPU 101. When an upshift gear change command input signal is inputted to CPU 101, the rotational speed of shift shaft 70 is set to $v_{max(up)}$. When a downshift gear change command input signal is inputted to CPU 101, the rotational speed of shift shaft 70 is set to $v_{max(down)}$. $v_{max(down)}$ and $v_{max(up)}$ are the rotational speeds of shift shaft 70 at which actuator 75 is driving at its maximum speed, or the maximum rotational speed of shift shaft 70.

After step S110, the gear change clutch is disengaged in step S120. In step S120, ECU 100 performs drive control (PWM control) of actuator 75 based on the target angular position set in step S100 and the rotational speed of shift shaft 70 set in step S110. When this process has been executed, shift shaft 70 rotates at the maximum rotational speed and gear change clutch 37 is disengaged.

After step S120, it is determined in step S130 whether or not the difference between the target angular position $\theta_t$ ($\theta_{max(up)}$ or $\theta_{max(down)}$) set in step S100 and the actual rotational angular position $\theta_R$ of shift shaft 70 detected by rotational angle sensor 106 (see FIG. 6) is zero. If $\theta_t - \theta_R$ is not zero, the process returns to step S130 and repeats until the difference becomes zero.

When $\theta_t - \theta_R$ is zero, then the rotational angular position is kept in step S140. In step S140, ECU 100 stops the rotation of shift shaft 70 and the actual rotational angular position of shift shaft 70 is kept. Consequently, gear change clutch 37 is kept disengaged.

After step S140, it is determined in step S150 whether or not a predetermined time has elapsed. In step S150, ECU 100 determines whether or not a predetermined time has elapsed since the rotational angular position of shift shaft 70 was kept in step S140. The process returns to step S150 until the predetermined time elapses.

When the predetermined time elapses in step S150, a target angular position is set in step S160 (FIG. 9). In step S160, ECU 100 sets a target angular position of shift shaft 70 based on the gear change command input signal inputted to CPU 101. When an upshift gear change command input signal is inputted to CPU 101, the target angular position $\theta_t$ is set to $\theta_{meet(up)}$. When a downshift gear change command input signal is inputted to CPU 101, the target angular position $\theta_t$ is set to $\theta_{meet(down)}$. $\theta_{meet(up)}$ and $\theta_{meet(down)}$ are the rotational angular positions of shift shaft 70 at which gear change clutch 37 becomes the half-clutch state while it is being engaged from the disengaged state.

After step S160, a rotational speed is set in step S170. In step S170, ECU 100 sets a rotational speed of shift shaft 70 based on the gear change command input signal inputted to CPU 101. When an upshift gear change command input signal is inputted to CPU 101, the rotational speed of shift shaft 70 is set to $v_{o(up)}$. When a downshift gear change command input signal is inputted to CPU 101, the rotational speed of shift shaft 70 is set to $v_{o(down)}$. The rotational speeds $v_{o(up)}$ and $v_{o(down)}$ are the maximum rotational speeds of shift shaft 70.

After step S170, the gear change clutch is engaged in step S180. In step S180, ECU 100 performs drive control (PWM control) of actuator 75 based on the target angular position set in step S160 and the rotational speed of shift shaft 70 set in step S170. When this process has been executed, shift shaft 70 rotates at the maximum rotational speed and gear change clutch 37 is engaged. The rotational direction of shift shaft 70 at this time is opposite to that in step S120, when gear change clutch 37 is being disengaged.

After step S180, it is determined in step S190 whether or not the difference between the target angular position at ($\theta_{meet(up)}$ or $\theta_{meet(down)}$) set in step S160 and the actual rotational angular position $\theta_R$ of shift shaft 70 detected by rotational angle sensor 106 (see FIG. 6) is zero. If $\theta_t - \theta_R$ is not zero, the process returns to step S190 and repeats until the difference becomes zero.

When $\theta_t - \theta_R$ is zero, a target angular position is set in step S200 (FIG. 10). In step S200, ECU 100 sets a target angular position of shift shaft 70 based on the gear change command input signal inputted to CPU 101. When an upshift gear change command input signal is inputted to CPU 101, the target angular position $\theta_t$ is set to $\theta_{on(up)}$. When a downshift gear change command input signal is inputted to CPU 101, the target angular position at is set to $\theta_{on(down)}$. $\theta_{on(up)}$ and $\theta_{on(down)}$ are the rotational angular positions of shift shaft 70 at which gear change clutch 37 becomes engaged after the half-clutch state while it is being engaged from the disengaged state.

After step S200, a rotational speed is set in step S210. In step S210, ECU 100 sets a rotational speed of shift shaft 70 based on the gear change command input signal inputted to CPU 101 and the half-clutch control table of FIG. 11. The half-clutch control table of FIG. 11 defines the rotational speeds for respective gears involved in gear changes. The gears involved in a gear change can be determined based on the gear in use when the shift change control process begins, that is, the gear in use before the shift change, and the gear change command input signal. For example, where the gear in use before a shift change is 2nd gear and an upshift gear change command input signal is inputted, ECU 100 determines a gear change from 2nd gear to 3rd gear. In FIG. 11, in a shift up from 2nd gear to 3rd gear, the rotational speed of shift shaft 70 is set to $v_{23(up)}$. Or, for example, in a shift down from 2nd gear to 1st gear, the rotational speed of shift shaft 70 is set to $v_{21(down)}$.

After step S210, half-clutch control is performed in step S220. In step S220, ECU 100 performs drive control (PWM control) of actuator 75 based on the target angular position set in step S200 and the rotational speed of shift shaft 70 set in step S210. When this process has been executed, shift shaft 70 rotates at a low speed and gear change clutch 37 is engaged at a low speed (half-clutch control).

After step S220, it is determined in step S230 whether or not the difference between the target angular position $\theta_t$ set in step S200 and the actual rotational angular position Or of shift shaft 70 detected by rotational angle sensor 106 (see FIG. 6) is zero. If $\theta_t-\theta_R$ is not zero, the process returns to step S230 and repeats until the difference becomes zero.

When $\theta_t-\theta_R$ is zero, shift shaft 70 is rotated in step S240 until the reference rotational angular position (0°) is reached. In step S240, ECU 100 sets the target angular position $\theta_t$ to the reference rotational angular position (0°) and rotates shift shaft 70 at a constant speed to return the actual rotational angular position of shift shaft 70 to the reference rotational angular position. When this process has been executed, gear change clutch 37 is returned to the reference position.

FIGS. 12 and 13 illustrate changes over time in the rotational angular position of shift shaft 70 during the shift change control process of FIGS. 8-10. FIG. 12 depicts a downshift operation, and FIG. 13 depicts an upshift operation. As shown in FIG. 12, when a downshift operation is performed, first of all, the target angular position and the rotational speed of shift shaft 70 are set to $\theta_{max(down)}$ and $v_{max(down)}$, respectively. Based on these values, drive control of actuator 75 is performed and gear change clutch 37 is disengaged. When gear change clutch 37 is disengaged, shift shaft 70 rotates at the maximum speed. When the actual rotational angular position of shift shaft 70 reaches the target angular position, shift shaft 70 stops rotating and is kept at that rotational angular position for a predetermined time.

After the rotational angular position of shift shaft 70 is kept over a predetermined period, the target angular position and rotational speed of shift shaft 70 are set to $\theta_{meet(down)}$ and $v_{o(down)}$, respectively. Based on these values, drive control of actuator 75 is performed and gear change clutch 37 is engaged. When gear change clutch 37 is engaged, shift shaft 70 rotates at the highest speed. The rotational direction of shift shaft 70 at this time is opposite to that at the time when the target angular position is $\theta_{max(down)}$.

When the actual rotational angular position of shift shaft 70 reaches the target angular position $\theta_{meet(down)}$, then the target angular position of shift shaft 70 is set to $\theta_{on(down)}$ and the rotational speed thereof is set based on the half-clutch control table (see FIG. 11). Based on these values, drive control of actuator 75 is performed and gear change clutch 37 is engaged at a low speed (half-clutch control). FIG. 12 shows changes over time in the rotational angular position of shift shaft 70 for respective gears involved in gear changes. The rotational speed of shift shaft 70 at a shift down from 2nd gear to 1st gear ($v_{21(down)}$) is lowest, and that at a shift down from 4th gear to 3rd gear ($v_{43(down)}$) is highest (see also FIG. 11). Because a larger amount of deceleration force is applied at a shift down to a lower gear, it is desirable that shift shaft 70 be rotated at a low speed and gear change clutch 37 be engaged at a low speed.

When the actual rotational angular position of shift shaft 70 reaches the target angular position $\theta_{on(down)}$, shift shaft 70 is rotated at a constant speed until the reference rotational angular position (0°) is reached to return gear change clutch 37 to the reference position.

When an upshift operation is performed, as shown in FIG. 13, the target angular position and the rotational speed are set to $\theta_{max(up)}$ and $v_{max(up)}$, respectively. The target angular position set at this time is opposite to that at the time of a shift down (in the case of FIG. 12). Based on these values, drive control of actuator 75 is performed and gear change clutch 37 is disengaged. When the actual rotational angular position of shift shaft 70 reaches the target angular position $\theta_{max(up)}$, shift shaft 70 stops rotating and is kept at that rotational angular position for a predetermined time.

After the rotational angular position of shift shaft 70 is kept over a predetermined period, the target angular position and the rotational speed are set to $\theta_{meet(up)}$ and $v_{o(up)}$, respectively. Based on these values, gear change clutch 37 is engaged. The rotational direction of shift shaft 70 at this time is also opposite to that at the time of a shift down (in the case of FIG. 12).

When the actual rotational angular position of shift shaft 70 reaches the target angular position $\theta_{meet(up)}$, then the target angular position of the shift shaft is set to $\theta_{on(up)}$ and the rotational speed thereof is set based on the half-clutch control table (see FIG. 11). Based on these values, gear change clutch 37 is engaged at a low speed (half-clutch control). FIG. 13 shows changes over time in the rotational angular position of shift shaft 70 for respective gears involved in gear changes. The rotational speed at a shift up from 1st gear to 2nd gear ($v_{12(up)}$) is lowest, and that at a shift up from 3rd gear to 4th gear ($v_{34(up)}$) is highest. As with a shift down, because a larger amount of deceleration force is applied at a shift up to a lower gear, it is desirable that shift shaft 70 be rotated at a low speed and gear change clutch 37 be engaged at a low speed.

When the actual rotational angular position of shift shaft 70 reaches the target angular position $\theta_{on(up)}$, shift shaft 70 is rotated at a constant speed until the reference rotational angular position (0°) is reached to return gear change clutch 37 to the reference position.

In this embodiment, the rotational speed $v_{12(up)}$ at a shift up from 1st gear to 2nd gear and the rotational speed $v_{21(down)}$ at a shift down from 2nd gear to 1st gear may be the same as or different from each other. Also, $v_{23(up)}$ and $v_{32(down)}$, and $v_{34(up)}$ and $v_{43(down)}$, may be the same as or different from each other.

As has been described, according to this embodiment, in response to an operation of shift up switch 102a or shift down switch 102b, the target angular position and rotational speed of shift shaft 70 are set based on the gear change command input signal inputted to CPU 101. Shift shaft 70 is rotationally driven at the set rotational speed until the set target rotational position is reached. Thus, shift shaft 70 reliably reaches the target angular position and the stability of shift changes is improved.

In the case where clutch 37 is engaged and disengaged in conjunction with rotation of shift shaft 70, as in this embodiment, the maximum rotatable angular position of shift shaft 70, the rotational angular position of shift shaft 70 at which the clutch becomes the half-clutch state, and the rotational angular position of shift shaft 70 at which the clutch is engaged from the half-clutch state may be different between when shift shaft 70 rotates forward and when it rotates in reverse, because of individual differences of actuator 75 that rotates shift shaft 70.

In this embodiment, however, since target angular positions to be set for a shift up and a shift down can be different from each other in magnitude, appropriate target angular positions can be set for each actuator 75, in spite of such individual differences of actuator 75. As a result, the stability of shift changes is improved. In the present invention, the term "magnitude of a target angular position" refers to the absolute value of a positive or negative target angular position. For example, the magnitude of a target angular position of 18° is 18, and the magnitude of a target angular position of −18° is 18. In the present invention, the target angular positions to be set for a shift up and a shift down may be the same as each other in magnitude.

Also in this embodiment, during half-clutch control, the rotational speeds of shift shaft 70 to be set for a shift up and a shift down may be different from each other. Thus, even when the target rotational speeds for a shift up and a shift down are different from each other in magnitude, it is possible to set rotational speeds according to the respective target rotational angular positions, thereby reducing the time required for shift changes. In the present invention, the rotational speeds to be set for a shift up and a shift down may be the same as each other in magnitude.

Also in this embodiment, during half-clutch control, in response to an operation of shift up switch 102a or shift down switch 102b, the gear to be used after a gear change is determined based on the gear change command input signal inputted to CPU 101 and the gear position detected by gear position sensor 103, and the rotational speed of shift shaft 70 is set based on the determination result. Specifically, the rotational speed is set lower at a shift change to a lower gear, and higher at a shift change to a higher gear. With this configuration, the engaging speed of gear change clutch 37 can be set according to the deceleration force to be applied to the vehicle body when gear change clutch 37 will be engaged.

Also, according to this embodiment, the target angular position at start of a shift change operation is set to the final target angular position ($\theta_{max(up)}$ or $\theta_{max(down)}$), that is, a predetermined rotational angular position $\theta_{max(up)}$ or $\theta_{max(down)}$ that is not less than the rotational angular position of shift shaft 70 at which gearbox 38 becomes the gear-in state, and that is less than the maximum rotatable angular position of shift shaft 70. Thus, shift shaft 70 reaches a rotational angular position where gearbox 38 can reliably change gears and the stability of shift changes is improved.

Also, since the target angular positions $\theta_{max(up)}$ and $\theta_{max(down)}$ are set to be less than the maximum rotatable angle of shift shaft 70, shift shaft 70 does not reach the maximum rotatable angular position. Thus, power consumption by actuator 75 is reduced. In addition, a large load is prevented from acting on shift gears 46 and 47, a transmitting member between shift shaft 70 and actuator 75 and so on because shift shaft 70 is abruptly stopped at the maximum rotatable angle. Consequently, rapid deterioration of shift gears 46 and 47, the transmitting member and so on is prevented.

Also according to this embodiment, when shift shaft 70 is rotated from the reference angular position (0°) to the final target angular position ($\theta_{max(up)}$ or $\theta_{max(down)}$), shift shaft 70 is driven at the rotational speed at which actuator 75 is driving at the maximum speed, or at the maximum rotational speed. No impact or the like is applied to the driven side of gear change clutch 37 when gear change clutch 37 is being disengaged. This allows shift shaft 70 to be rotated at the maximum rotational speed and gear change clutch 37 to be disengaged at the maximum speed, thereby reducing the time required for shift changes.

Also, in this embodiment, when the difference between the set final target angular position and the actual rotational angular position of shift shaft 70 detected by the rotational angular position 106 is zero, shift shaft 70 is determined to have reached the above final target angular position. By performing drive control of shift actuator 75 while monitoring the difference between the detected actual rotational angular position and the final target angular position, shift shaft 70 reaches the target angular position more reliably.

Also, in this embodiment, after a final target angular position is set and shift shaft 70 reaches the final target angular position, the final target angular position is set to the reference angular position (0°). Thus, shift shaft 70 reliably reaches the reference angular position as the target angular position in the course of engaging gear change clutch 37 and the stability of shift changes is improved.

Also, in this embodiment, target angular positions ($\theta_{meet(up)}$ or $\theta_{meet(down)}$, and $\theta_{on(up)}$ or $\theta_{on(down)}$) are set between the final target angular position ($\theta_{max(up)}$ or $\theta_{max(down)}$) and the reference angular position (0°), and different rotational speeds are set between when shift shaft 70 is rotating from $\theta_{max}$ to $\theta_{meet}$ and when shift shaft 70 is rotating from $\theta_{meet}$ to $\theta_{on}$. Thus, in the course of engaging gear change clutch 37, the engaging speed from the disengaged state to the half-clutch state and that during the half-clutch state can be set to be different from each other.

The target angular position of shift shaft 70 has been described as being set based only on the gear change command input signal. However, the present invention is not so limited. The target angular position of shift shaft 70 may be set based on other factors such as speed change command input. For example, the gear involved in a gear change may be determined based on the gear change command input signal and the gear position detected by gear position sensor 103 to set the target angular position based on the determined gear involved in the gear change.

Shift shaft 70 has been described as having reached the target rotational angular position when the difference between the target rotational angular position and the actual rotational angular position is zero. However, the gear change control device may determine that shift shaft 70 has reached the target rotational angular position when the difference between the target rotational angular position and the actual rotational angular position has reached a predetermined threshold value that is close to but not necessarily equal to zero.

Also, in this embodiment, it is desirable that an alarm be issued in response to an abnormality which has occurred during a shift change operation (during rotation of shift shaft 70).

An example of abnormality during a shift change operation is improper disengagement of gear change clutch 37, which is determined for example if the actual rotational angular position of shift shaft 70 has not reached the final target angular position ($\theta_{max(up)}$ or $\theta_{max(down)}$) even when a predetermined time has elapsed since start of a shift change.

Another example of abnormality during a shift change operation is a shift change taking too long a time, which is determined for example if the time from start to completion of a shift change is a predetermined time or more.

Still another example of abnormality during a shift change operation is improper completion of a gear change of gearbox 38, which is determined for example if gear position sensor 103 does not detect completion of a gear change during a period from start to completion of a shift change.

An indicator (not shown) may be provided in the vicinity of handlebars 94 to alarm the rider that an abnormality has occurred. In this case, the indicator corresponds to the warning indicating device of the present invention.

Alternatively, as an alarm that an abnormality has occurred, a separate warning light may be provided that flashes on and off for example when actuator 75 has been driven for a predetermined time or more.

As another example, to provide an alarm that an abnormality has occurred, a separate sound generating device may generate sound for example when actuator 75 has been driven for a predetermined time or more. In this case, the sound generating device corresponds to the warning sound generating device of the present invention.

As still another example, to provide an alarm that an abnormality has occurred, CDI unit 105 may prohibit ignition for example when actuator 75 has been driven for a predetermined time or more. In this case, CDI unit 105 corresponds to the ignition control device of the present invention. While ignition is prohibited, engine speed does not increase even when the accelerator is operated.

As yet another example to provide an alarm that an abnormality has occurred, the fuel injecting device may be prohibited from injecting fuel for example when actuator 75 has been driven for a predetermined time or more. While fuel injection is prohibited, engine speed does not increase even when the accelerator is operated.

Also, in this embodiment, it is desirable that actuator 75 drive shift shaft 70 to return shift shaft 70 to the reference angular position (0°) after an abnormality is detected during a shift change operation and an alarm about the abnormality is issued to the rider. This prevents engagement of gear change clutch 37 before a shift change is completed properly.

Abnormalities related to shift changes (a series of operations of disengaging gear change clutch 37, changing gears of gearbox 38 and engaging gear change clutch 37) can have either an abnormality content for which subsequent shift changes are prohibited, or an abnormality content for which subsequent shift changes are allowed. A memory 109 (see FIG. 6) of ECU 100, or the like, stores abnormality contents for which subsequent shift changes are prohibited ("first type abnormality contents") and abnormality contents for which subsequent shift changes are allowed ("second type abnormality contents"), so that subsequent shift changes are prohibited if the detected abnormality has a first type abnormality content, and allowed if the detected abnormality has a second type abnormality content. That is, if a detected abnormality has a first type abnormality content, a shift change is not performed even when shift up switch 102*a* or shift down switch 102*b* is operated, and if a detected abnormality has a second type abnormality content, a shift up or a shift down is performed in response to an operation of shift up switch 102*a* or shift down switch 102*b*.

The first type abnormality contents and the second type abnormality contents are not specifically limited, but may be set as shown in the table of FIG. 14, for example. In this example, abnormalities No. 1 to 9 have a first type abnormality content, and abnormalities No. 10 to 12 have a second type abnormality content.

Abnormality No. 1 corresponds to a case where a shift change is not completed for a reason other than dog abutment. In this embodiment, dog abutment is not considered as an abnormality. In the case of an abnormality No. 1, an alarm about the abnormality is issued and subsequent shift changes are prohibited. That is, even if shift up switch 102*a* or shift down switch 102*b* is operated subsequently, shift changes are not performed. In this case, shift changes are prohibited until the main switch is turned off. That is, ECU 100 continues perceiving an abnormality and an alarm about the abnormality continues being issued until the power is turned off.

Abnormality No. 2 corresponds to a case where the gear being used when a shift change is completed is neither the target gear nor the gear being used before a gear change. Examples include a case where the gear being used is 3rd gear after a shift change from 1st gear to 2nd gear. In this case, an alarm about the abnormality is issued, and subsequent shift changes are prohibited until the main switch is turned off.

Abnormality No. 3 corresponds to a case where a shift change is performed even in the absence of a gear change command. Examples include a case where a shift change is performed although shift up switch 102*a* or shift down switch 102*b* has not been operated. In this case, an alarm about the abnormality is issued, and shift changes are prohibited until the main switch is turned off.

Abnormality No. 4 corresponds to a case where a failure occurs in the angle sensor system. Examples include a case where rotational angle sensor 106 itself is out of order, a case where the signal line between rotational angle sensor 106 and ECU 100 is broken, and so on. In this case, an alarm about the abnormality is issued, and shift changes are prohibited until the main switch is turned off.

Abnormality No. 5 corresponds to a case where an abnormality occurs in the signal representing engine speed. Examples of abnormality No. 5 include a case where an abnormality occurs in the signal line for communicating information about the engine speed. In this case, an alarm about the abnormality is issued, and shift changes are prohibited until the main switch is turned off.

Abnormality No. 6 corresponds to a case where an abnormality occurs in the terminal voltage of the motor (not shown) of actuator 75. In this case, an alarm about the abnormality is issued, and shift changes are prohibited until the main switch is turned off.

Abnormality No. 7 corresponds to a case where an abnormality occurs in shift down switch 102*b*. In this case, an alarm about the abnormality is issued, and shift changes are prohibited until the main switch is turned off.

Abnormality No. 8 corresponds to a case where an abnormality occurs in shift up switch 102*a*. In this case, an alarm about the abnormality is issued, and shift changes are prohibited until the main switch is turned off.

Abnormality No. 9 corresponds to a case where an abnormality occurs in the detection of the gear position. For example, an abnormality No. 9 is determined in a case where an abnormality occurs in gear position sensor 103. In this case, an alarm about the abnormality is issued, and subsequent shift changes are prohibited until the gear position is determined. However, in the case of an abnormality No. 9, subsequent shift changes may be allowed if the engine speed is lower than a predetermined value. In this case, an abnormality continues being detected (abnormality detecting state), and the abnormality detecting state is canceled once the gear position is determined.

Abnormality No. 10 corresponds to a case where a shift change is performed but the time from start to completion of the shift change is more than a predetermined time. In this case, an alarm about the abnormality is issued, but subsequent shift changes are allowed. That is, if shift up switch 102*a* or shift down switch 102*b* is operated subsequently, a shift up or a shift down is performed. In this case, the abnormality detecting state is held as long as both of the following conditions are satisfied in subsequent shift changes: condition 1) the target gear is used at the completion of a shift change; and condition 2) the time from start to completion of the shift change is more than a predetermined value. Examples of abnormality No. 10 include deterioration of a battery, something being caught on shift shaft 70, an abnormality of the motor, and so on. When condition 1) becomes unsatisfied (i.e., the target gear is not used at the completion of a shift change), the process proceeds from abnormality No. 10 determining mode to another abnormality determining mode (for example, abnormality No. 9) for further processing.

Abnormality No. 11 corresponds to a case where an abnormality occurs during the initial check. In this case, an alarm about the abnormality is issued, but subsequent shift changes are allowed. When the main switch is turned off, the abnormality detecting state is canceled.

Abnormality No. 12 corresponds to a case where an engine stall (engine stop) occurs. The method for determining an engine stall is not specifically limited. Here, an engine stall is determined when the signal representing the engine speed (engine speed signal) is lower than a predetermined value (or in the Low level) and the engine speed is not higher than a predetermined speed. In the case of an abnormality No. 12, an alarm is issued, but subsequent shift changes are allowed. In this case, the abnormality detecting state is canceled when the engine speed signal comes out of the Low level and the engine speed becomes higher than a predetermined value.

As has been described above, the present invention is useful for a gear change control device.

The particular embodiments of the invention described in this document should be considered illustrative, rather than restrictive. Modification to the described embodiments may be made without departing from the spirit of the invention as defined by the following claims.

The invention claimed is:

1. A gear change control device for a straddle-type vehicle including a gear change command inputting device to which a gear change command is inputted, a gear change clutch, a gearbox, a gear position detecting device arranged to detect a gear position of the gearbox, a shift shaft, and an actuator arranged to engage and disengage the gear change clutch and changing gears of the gearbox by rotating the shift shaft from a reference angular position, the gear change control device comprising:

a rotational angle detecting device arranged to detect a rotational angular position of the shift shaft;

a target angular position setting device arranged to set a target angular position of the shift shaft based on an input from the gear change command inputting device;

a rotational speed setting device arranged to set a rotational speed of the shift shaft based on the input from the gear change command inputting device; and a control unit programmed to calculate, based on an actual rotational angular position detected by the rotational angle detecting device and the target angular position set by the target angular position setting device, a difference between the actual rotational angular position and the target angular position, and to perform drive control of the actuator based on the calculated difference between the actual rotational angular position and the target angular position and the rotational speed set by the rotational speed setting device; wherein the control unit is programmed to change the rotational speed of the shift shaft set by the rotational speed setting device based on the gear position detected by the gear position detecting device.

2. The gear change control device according to claim 1, wherein the target angular position setting device sets a target angular position for upshifting when an upshift command is inputted from the gear change command inputting device, and sets a target angular position for downshifting when a downshift command is inputted from the gear change command inputting device.

3. The gear change control device according to claim 2, wherein the target angular position setting device sets target angular positions of different magnitudes between when an upshift command is inputted and when a downshift command is inputted, from the gear change command inputting device.

4. The gear change control device according to claim 3, wherein the rotational speed setting device sets a rotational speed for upshifting when an upshift command is inputted from the gear change command inputting device, and sets a rotational angle for downshifting when a downshift command is inputted from the gear change command inputting device.

5. The gear change control device according to claim 4, wherein the rotational speed setting device sets rotational speeds of different magnitudes between when an upshift command is inputted and when a downshift command is inputted, from the gear change command inputting device.

6. The gear change control device according to claim 1, wherein the rotational speed setting device sets the rotational speed of the shift shaft based on the input from the gear change command inputting device and the gear position detected by the gear position detecting device.

7. The gear change control device according to claim 1, wherein the target angular position setting device sets a final target angular position that is not less than a rotational angular position of the shift shaft at which the gearbox becomes a gear-in state, and that is less than a maximum rotatable angular position of the shift shaft.

8. The gear change control device according to claim 7, wherein the rotational speed setting device sets a predetermined speed at which to rotate the shift shaft toward the final target angular position.

9. The gear change control device according to claim 8, wherein the predetermined speed is a rotational speed of the shift shaft at which the actuator is driving at a maximum speed.

10. The gear change control device according to claim 7, wherein the control unit determines that the shift shaft has reached the final target angular position based on a difference between the final target angular position and the actual rotational angular position detected by the rotational angle detecting device.

11. The gear change control device according to claim 7, wherein the target angular position setting device resets the final target angular position to the reference angular position after the actual rotational angular position of the shift shaft has reached the final target angular position.

12. The gear change control device according to claim 11, wherein:

the target angular position setting device sets a target angular position between the final target angular position and the reference angular position after the actual rotational angular position of the shift shaft has reached the final target angular position; and the rotational speed setting device sets different rotational speeds between before and after the target angular position that is set between the final target angular position and the reference angular position.

13. The gear change control device according to claim 7, further comprising:

an abnormality detecting device arranged to detect an abnormality during rotation of the shift shaft; and an alarming device arranged to issue an alarm to the rider in response to an abnormality detected by the abnormality detecting device.

14. The gear change control device according to claim 13, wherein the abnormality detecting device determines that an abnormality has occurred in a case where the actual rotational angular position has not reached the final target angular position when a predetermined time has elapsed.

15. The gear change control device according to claim 14, wherein the control unit performs drive control of the actuator so as to return the rotational angular position of the shift shaft to the reference angular position after an alarm has been issued by the alarming device.

16. The gear change control device according to claim 13, wherein the abnormality detecting device determines that an abnormality has occurred in a case where a time from start to completion of a shift change is a predetermined time or more.

17. The gear change control device according to claim 13, wherein the abnormality detecting device determines that an abnormality has occurred in a case where the gear position detecting device has not detected completion of a gear change during a time from start to completion of a shift change.

18. The gear change control device according to claim 13, further comprising:
- a storage device arranged to store a preset first type abnormality content that prohibits a shift change and a preset second type abnormality content that allows a shift change,
- wherein the control unit disables a shift change in a case where an abnormality detected by the abnormality detecting device has the first type abnormality content, irrespective of a subsequent input from the gear change command inputting device, and enables a shift change in a case where an abnormality detected by the abnormality detecting device has the second type abnormality content, according to a subsequent input from the gear change command inputting device.

19. The gear change control device according to claim 13, wherein the alarming device is a warning light.

20. The gear change control device according to claim 13, wherein the alarming device is a warning sound generating device.

21. The gear change control device according to claim 13, wherein the alarming device is a warning indicating device.

22. The gear change control device according to claim 13, wherein the alarming device is an ignition control device that prohibits ignition in response to an abnormality detected by the abnormality detecting device.

23. The gear change control device according to claim 13, wherein the alarming device is a fuel injecting device that prohibits fuel injection in response to an abnormality detected by the abnormality detecting device.

24. A straddle-type vehicle comprising the gear change control device according to claim 1.

* * * * *